2,948,690

PHOSPHORUS CONTAINING POLYURETHANES

Robert B. Fox, Glen Echo Heights, Md., assignor to the United States of America as represented by the Secretary of the Navy No Drawing. Filed Sept. 16, 1957, Ser. No. 684,378

11 Claims. (Cl. 260—2.2)

(Granted under Title 35, U.S. Code (1952), sec. 266)

The invention described herein may be manufactured and used by or for the Government of the United States of America for governmental purposes without the payment of any royalties thereon or therefor.

This invention relates to new organic polymers which are polyurethanes containing acid groups and to a process for preparing the same.

Compounds which contain strongly acidic functions normally react with isocyanates to give carbon dioxide and a mixture of products, none in high yield.

I have found that reaction between hydrocarbon diisocyanates and compounds having a single acid group which is carboxyl or acidic hydroxyl and otherwise contain only a pair of active hydrogen atoms as functional groups can be directed to produce a single product which is a new linear polyurethane. By the additional presence of a small amount, e.g., about 5 mol percent, of a hydrocarbon triisocyanate or a hydrocarbon trihydric alcohol in the reactant mixture, new cross-linked polymers can be obtained.

According to the process of my invention, the above defined compounds of single acid function are first reacted with a tertiary amine to form the corresponding salt at the acid group, i.e., at the carboxyl or acidic hydroxyl group. This may be accomplished by adding the tertiary amine in equi-molar proportion to the compound of acid function in a volatile organic solvent for the resulting tertiary amine salt. The hydrocarbon diisocyanate is added in a gradual manner over an extended period of time to the solvent solution of the tertiary amine salt at room temperature. A suitable ratio of the solvent to the salt for the reaction is about one liter of the solvent to one mole of the salt. The reaction may be carried out at temperatures above room temperature, if desired, for example, up to about 100° C. or thereabout.

The reaction between the diisocyanate and salt of the compound of acid function is one of addition and therefore quantitative in respect to the product polymer. The product polymers are formed as the tertiary amine salt which are recovered by evaporation of the solvent. They can be converted to the free acid by suspending them in water and adding mineral acid, e.g., hydrochloric acid, thereto. As the free acid, they are ion-exchange resins, a metal ion forming a salt with the acid groups thereof. The cross-linked polymers are solids which can be granulated for preparation of ion-exchange layers or beds.

Among the hydrocarbon diisocyanates which may be used for preparation of the new acid group-containing polymers are, for example, aryl and alkylaryl diisocyanates of the benzene and naphthalene series, such as 2,4-tolylene diisocyanate, 2,6-tolylene diisocyanate, 4,4'-xenylene diisocyanate, 3,3'-dimethyl-4,4'-diphenylene diisocyanate, methylene bis (4-phenylisocyanate), 1,5-naphthalene diisocyanate, etc., and alkylene diisocyanates, such as those having from 2 to 10 methylene groups, e.g., ethylene, propylene and butylene diisocyanates and especially, hexamethylene diisocyanate, etc. For preparation of cross-linked polymers in accordance with the process of the invention, a suitable triisocyanate is, for example, triphenylmethane triisocyanate. A suitable hydrocarbon trihydric alcohol for this purpose is, for example, glycerol.

Among the acid compounds which may be reacted with the hydrocarbon di- and triisocyanates for producing polymers in accordance with the process of the invention are, for example, hypophosphorus acid, $H_2P(O)OH$, bis (hydroxyalkyl) phosphinic acids, e.g., bis (hydroxyethyl)-, bis (hydroxypropyl)-, bis (hydroxybutyl)-phosphinic acids, etc., dihydroxy alkylmonocarboxylic acids, e.g., glyceric acid, 2-methylglyceric acid, bis (hydroxymethyl) acetic acid, etc.

The tertiary amine salt of the compound of acid function is generally to be readily formed by the use of triethylamine and benzene as the volatile organic solvent for making up the solution of the salt to be employed in the reaction with the hydrocarbon diisocyanate. However, any tertiary amine may be so employed which has a pKb in water of 10 or less, such as tri-n-propyl, tri-n-butyl-, tri-isobutyl- and tri-n-amylamine, tricyclohexylamine and pyridine, etc. Any volatile solvent for the tertiary amine salt can be used provided it is inert under the conditions of the reaction.

The process of the invention is illustrated by following specific examples of the application thereof. Parts are by weight.

Example 1

Triethylamine in equimolar proportion is added, with stirring, to 112 parts bis (hydroxymethyl) phosphinic acid in 1000 parts of benzene at room temperature. To the benzene solution of the triethylamine salt at room temperature is gradually added under stirring and over a period of 2 hours, 175 parts 2,4-tolylene diisocyanate. The resulting linear polymer is recovered by evaporation of the benzene in practically quantitative yield. It is of syrupy consistency and contains the recurring unit,

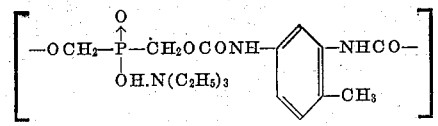

The free acid polymer is obtained therefrom by suspending the salt of the polymer in water and adding an excess of hydrochloric acid and washing with water to remove the amine-hydrochloride salt residue.

Example 2

In the manner of the previous example, a linear polymer containing the recurring unit:

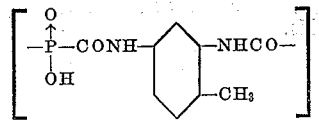

is obtained in practically quantitative yield by employing an equimolar proportion of hypophosphorus acid in place of the bis (hydroxymethyl) phosphinic acid.

Example 3

Proceeding as in Example 1, and employing an equimolar proportion of the triethylamine salt of bis-hydroxymethylacetic acid for reaction with the tolylene diisocyanate, a linear polymer is obtained in which the recurring unit is:

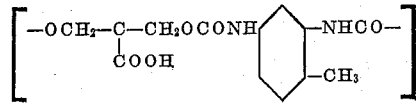

Example 4

Proceeding as in Example 1, but adding 8 parts of triphenylmethane triisocyanate to the diisocyanate, there is obtained an insoluble cross-linked polyurethane. In the free acid form, this polymer is a cation-exchange resin.

Example 5

Proceeding as in Example 1 and adding 5 parts glycerol to the phosphinic acid, there is obtained an insoluble cross-linked polyurethane which in the free acid form is a cation-exchange resin.

Since it is apparent that various embodiments of the invention herein described may be made without departing from the spirit or scope thereof, it is not intended that it shall be limited to certain specific embodiments herein contained by way of illustration but only by the prior art and the appended claims.

What is claimed is:

1. A process for preparing linear polyurethanes which comprises reacting a hydrocarbon diisocyanate in equimolar proportion with a tertiary amine salt of a trifunctional compound selected from the group consisting of hypophosphorus acid and bis (hydroxyalkyl) phosphinic acids and in the presence of an inert volatile organic solvent for the tertiary amine salt.

2. A process of preparing linear polyurethanes which comprises reacting a hydrocarbon diisocyanate selected from the group consisting of aryl and alkylaryl diisocyanates in equimolar proportion with a tertiary amine salt of a trifunctional compound selected from the group consisting of hypophosphorus acid and bis (hydroxyalkyl) phosphinic acids and in the presence of an inert volatile organic solvent for the tertiary amine salt.

3. A process of preparing linear polyurethanes which comprises reacting a tolylene diisocyanate in equimolar proportion with the triethylamine salt of a trifunctional compound selected from the group consisting of hypophosphorus acid and bis (hydroxyalkyl) phosphinic acids in the presence of an inert volatile organic solvent for the triethyl amine salt.

4. The process of preparing linear polyurethanes as defined in claim 1, wherein the solvent is evaporated from the polyurethane product and the latter is reacted with aqueous mineral acid to yield the polyurethane in the form of the free acid.

5. A polyurethane which is the linear polymeric product of the reaction in equimolar ratio of a hydrocarbon diisocyanate with a tertiary amine salt of a trifunctional compound selected from the group consisting of hypophosphorus acid and bis (hydroxyalkyl) phosphinic acids.

6. A polyurethane which is the linear polymeric product of the reaction in equimolar ratio of a hydrocarbon diisocyanate selected from the group consisting of aryl and alkylaryl diisocyanates with a tertiary amine salt of a trifunctional compound selected from the group consisting of hypophosphorus acid and bis (hydroxyalkyl) phosphinic acids.

7. A polyurethane which is the linear polymeric product of the reaction in equimolar ratio of a tolylene diisocyanate with a tertiary amine salt of a trifunctional compound selected from the group consisting of hypophosphorus acid and bis (hydroxyalkyl) phosphinic acids.

8. A polyurethane which is the linear polymeric product of the reaction in equimolar ratio of a tolylene diisocyanate with a tertiary amine salt of a trifunctional compound selected from the group consisting of hypophosphorus acid and bis (hydroxyalkyl) phosphinic acids.

9. A solid polyurethane which is a cross-linked polymeric product of the reaction between a hydrocarbon diisocyanate and a tertiary amine salt of a trifunctional compound selected from the group consisting of hypophosphorus acid and bis (hydroxyalkyl) phosphinic acids in equimolar ratio and a small amount of a trifunctional compound selected from the group consisting of a hydrocarbon triisocyanate and a hydrocarbon trihydric alcohol.

10. A process of preparing polyurethanes which comprises reacting a hydrocarbon diisocyanate in equimolar proportion with a tertiary amine salt of a trifunctional compound selected from the group consisting of hypophosphorus acid and bis (hydroxyalkyl) phosphinic acids in the presence of a small amount of a trifunctional compound selected from the group consisting of hydrocarbon triisocyanates and hydrocarbon trihydric alcohols and an inert volatile organic solvent for the tertiary amine salt.

11. A process of preparing polyurethanes which comprises reacting a hydrocarbon diisocyanate selected from the group consisting of aryl and alkaryl diisocyanates in equimolar proportion with a tertiary amine salt of a trifunctional compound selected from the group consisting of hypophosphorus acid and bis (hydroxyalkyl) phosphinic acids in the presence of a small quantity of a trifunctional compound selected from the group consisting of hydrocarbon triisocyanates and hydrocarbon trihydric alcohols and an inert volatile organic solvent for the tertiary amine salt.

References Cited in the file of this patent

UNITED STATES PATENTS

| 2,779,689 | Reis | Jan. 29, 1957 |
| 2,811,493 | Simon | Oct. 29, 1957 |
| 2,864,780 | Katz | Dec. 16, 1958 |

FOREIGN PATENTS

| 901,768 | France | Nov. 13, 1944 |
| 64,452 | Netherlands | Oct. 15, 1949 |

OTHER REFERENCES

Kern et al.: Makromolekulare Chem., vol. 16, pp. 89–108, 1955.

Paint Oil and Chemical Review, vol. 116, pp. 28–30, Dec. 17, 1953.